(12) United States Patent
Tomobe et al.

(10) Patent No.: US 9,979,428 B2
(45) Date of Patent: May 22, 2018

(54) HAND STRAP FOR ELECTRONIC APPARATUS

(71) Applicant: PANASONIC INTELLECTUAL PROPERTY MANAGEMENT CO., LTD., Osaka (JP)

(72) Inventors: Shinji Tomobe, Kanagawa Ken (JP); Eiji Saitoh, Kanagawa Ken (JP); Masami Tatehana, Kanagawa Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/398,078

(22) Filed: Jan. 4, 2017

(65) Prior Publication Data
US 2017/0244438 A1  Aug. 24, 2017

(30) Foreign Application Priority Data
Feb. 19, 2016  (JP) .................................. 2016-030391

(51) Int. Cl.
*H04M 1/00* (2006.01)
*H04B 1/3888* (2015.01)
*H04B 1/3827* (2015.01)

(52) U.S. Cl.
CPC ........... *H04B 1/3888* (2013.01); *H04B 1/385* (2013.01); *H04B 2001/3861* (2013.01)

(58) Field of Classification Search
CPC ......... A45C 2011/002; A45F 2005/008; A45F 2200/0516; A45F 5/00; B62J 11/00;
(Continued)

(56) References Cited

U.S. PATENT DOCUMENTS 6,732,374 B1 * 5/2004 Blair .................... A41D 13/082
2/20
8,528,798 B2 * 9/2013 Chen ...................... A45C 3/001
224/217

(Continued)

FOREIGN PATENT DOCUMENTS

JP  2006-255024     9/2006
JP  2006-307918 A  11/2006
(Continued)

*Primary Examiner* — Tan H Trinh
(74) *Attorney, Agent, or Firm* — McDermott Will & Emery LLP

(57) ABSTRACT

A hand strap for an electronic apparatus is provided with a first gripper, which is attached to a rear surface of an electronic apparatus in a removable manner, and a second gripper. The first gripper has a main body and an accommodation portion. The second gripper includes a fixed portion and an extra-long portion, one end of which is a free end. The extra-long portion is accommodated inside the accommodation portion, and can adjust the entire length of the second gripper. A finger accommodation space in which a finger other than a thumb is disposed between the first gripper and the second gripper, is defined. By gripping the first gripper with the pad and the tip end of a finger other than a thumb, it is possible to perform operation with a thumb over a wide area of a touch panel while holding an electronic apparatus with one hand.

3 Claims, 11 Drawing Sheets

(58) Field of Classification Search
CPC ...... F16M 13/00; F16M 13/022; F16M 13/04; H04B 1/385; H04B 2001/3861; H04M 1/04; H04M 1/185
USPC ....... 455/575.6, 90.3, 575.1, 575.8; 224/217, 224/218, 930, 250, 267; 361/679.03, 361/683; 206/570, 701, 38, 320, 37; 248/441.1, 688, 451; 294/160, 167
See application file for complete search history.

(56) References Cited

U.S. PATENT DOCUMENTS

| | | | | |
|---|---|---|---|---|
| 8,622,447 | B1* | 1/2014 | Wirtz | H04B 1/385 224/217 |
| 8,746,448 | B1* | 6/2014 | Bellace | A45F 5/00 206/320 |
| 9,074,725 | B2* | 7/2015 | Trotsky | F16M 11/043 |
| 9,277,804 | B1* | 3/2016 | Gennodie | A45C 1/02 |
| 9,362,968 | B1* | 6/2016 | Haymond | H04B 1/385 |
| 9,407,743 | B1* | 8/2016 | Hirshberg | H04M 1/04 |
| 9,793,941 | B1* | 10/2017 | Hirsch | H04B 1/3888 |
| 2003/0109314 | A1* | 6/2003 | Ku | A63F 13/02 463/47 |
| 2005/0250455 | A1* | 11/2005 | Lee | H04B 1/385 455/90.3 |
| 2006/0054704 | A1* | 3/2006 | Fitch | G06F 1/1626 235/472.01 |
| 2006/0204241 | A1* | 9/2006 | Koide | A45C 13/30 396/423 |
| 2006/0274493 | A1* | 12/2006 | Richardson | G06F 1/1626 361/679.4 |
| 2009/0194444 | A1* | 8/2009 | Jones | A45C 3/00 206/320 |
| 2009/0219677 | A1* | 9/2009 | Mori | A45F 3/14 361/679.03 |
| 2010/0296235 | A1* | 11/2010 | Takemasa | G06F 1/1616 361/679.21 |
| 2011/0089078 | A1* | 4/2011 | Ziemba | A45C 1/04 206/570 |
| 2013/0148271 | A1* | 6/2013 | Huang | H04B 1/3888 361/679.01 |
| 2013/0240578 | A1* | 9/2013 | Yu | H04B 1/385 224/197 |
| 2013/0295549 | A1* | 11/2013 | Hills | G09B 7/00 434/379 |
| 2013/0299365 | A1* | 11/2013 | Andrew | A45C 13/002 206/37 |
| 2014/0084035 | A1* | 3/2014 | Georges | A45F 5/00 224/267 |
| 2014/0159405 | A1* | 6/2014 | Potter | A45F 5/10 294/160 |
| 2014/0202886 | A1* | 7/2014 | Kim | A45F 5/00 206/38 |
| 2014/0216954 | A1* | 8/2014 | Law | A45F 5/02 206/45.23 |
| 2014/0364176 | A1* | 12/2014 | Pintor | H04B 1/385 455/575.6 |
| 2015/0009610 | A1* | 1/2015 | London | G06F 1/163 361/679.03 |
| 2015/0103019 | A1* | 4/2015 | Young | A45F 5/00 345/173 |
| 2015/0201723 | A1* | 7/2015 | Rayner | G06F 1/1601 224/191 |
| 2015/0318885 | A1* | 11/2015 | Earle | H04B 1/385 455/575.6 |
| 2015/0335138 | A1* | 11/2015 | Juarbe | A45F 5/00 224/218 |
| 2015/0349831 | A1* | 12/2015 | Young | H04B 1/3888 455/575.8 |
| 2016/0020808 | A1* | 1/2016 | Lee | H04B 1/3888 455/575.6 |
| 2016/0049983 | A1* | 2/2016 | Ripka | H04B 1/385 455/575.6 |
| 2016/0078752 | A1* | 3/2016 | Vardi | G08B 29/046 340/506 |
| 2016/0183393 | A1* | 6/2016 | Groom | A45C 11/00 280/33.992 |
| 2016/0233909 | A1* | 8/2016 | West | H04B 1/385 |
| 2016/0254836 | A1* | 9/2016 | Alsberg | H04B 1/3888 455/575.8 |
| 2017/0000250 | A1* | 1/2017 | Carnevali | A45F 5/10 |
| 2017/0353208 | A1* | 12/2017 | Wilson | H04M 1/18 |

FOREIGN PATENT DOCUMENTS

| | | |
|---|---|---|
| JP | 3135779 U | 9/2007 |
| JP | 2011-130887 A | 7/2011 |
| JP | 2013-215460 | 10/2013 |

\* cited by examiner

HAND STRAP FOR ELECTRONIC APPARATUS

RELATED APPLICATION

This application claims the benefit of Japanese Application No. 2016-030391, filed on Feb. 19, 2016, the disclosure of which Application is incorporated by reference herein.

BACKGROUND

1. Technical Field

The present disclosure relates to a hand strap for an electronic apparatus that is attached to an electronic apparatus.

2. Description of the Related Art

Straps and hand belts with which an electronic apparatus is held with one hand are known (Japanese Patent Unexamined Publication No. 2011-130887, Japanese Patent Unexamined Publication No. 2006-307918, and Japanese Registered Utility Model No. 3135779).

Japanese Patent Unexamined Publication No. 2011-130887 discloses a strap attachment structure in which attachment of a hand strap is completed with a single attachment action using a metal attachment and a loosely fitting portion of a handheld terminal. Japanese Patent Unexamined Publication No. 2006-307918 discloses a mobile terminal that is provided with a hand belt in which dropping of the mobile terminal is prevented as a result of a tongue portion of the hand belt being attached to the hand belt using Velcro (registered trademark). Japanese Registered Utility Model No. 3135779 discloses a strap for a mobile phone handset in which one-handed holding of a mobile phone handset is made easy as a result of the strap for a mobile phone handset, which is stretchable, being attached to a lower portion of the mobile phone.

SUMMARY

In recent years, the demand for making operation with one hand possible has increased in electronic apparatuses for professional use in particular. In addition, in step with the increase in size of electronic apparatuses and the introduction of touch panels, it is necessary to make operation of a touch panel with a thumb possible while holding a large casing with one hand. However, in the straps and hand belts disclosed in Japanese Patent Unexamined Publication No. 2011-130887, Japanese Patent Unexamined Publication No. 2006-307918, and Japanese Registered Utility Model No. 3135779, holding with one hand is possible in some manner, but there is a technical problem in that it is difficult to reach a thumb across the wide area of an enlarged touch panel.

The object of the present disclosure is to provide a hand strap for an electronic apparatus in which operation of a touch panel while holding with one hand is easy.

A hand strap for an electronic apparatus of the present disclosure is provided with a first gripper, which can be attached to a rear surface of an electronic apparatus, and is gripped by a pad of a finger other than a thumb, and a tip end of a finger other than a thumb, and a second gripper that is provided on a far side from the rear surface with respect to the first gripper, and that defines a finger accommodation space in which a finger other than a thumb is disposed in the space between the first gripper and the second gripper.

According to the present disclosure, it is possible to provide a hand strap for an electronic apparatus in which holding of an electronic apparatus using one hand is stable, and in which it is possible for the thumb of the one hand performing the holding to move across a wide area of a touch panel of the electronic apparatus and screen operation becomes easy.

DETAILED DESCRIPTION

Figure 1:
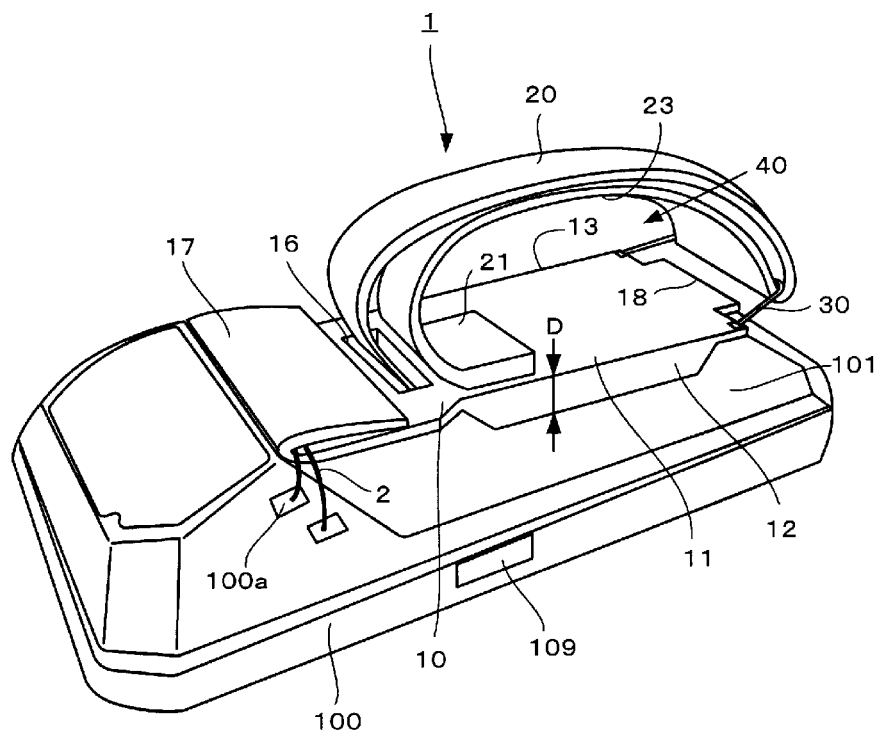
FIG. 1 is a front perspective view of a hand strap for an electronic apparatus according to an embodiment of the present disclosure.

Hereinafter, an embodiment (hereinafter, referred to as "the present embodiment") in which a hand strap for an electronic apparatus and a charging adapter according to the present disclosure are specifically disclosed, will be described in detail while referring to the drawings as appropriate. However, there are cases in which unnecessary detailed description is omitted. For example, there are cases in which the detailed descriptions of previously well-known features and overlapping descriptions of substantially the same configurations are omitted. The reasons for this are to avoid unnecessary redundancy, and to facilitate the understanding of persons skilled in the art. Additionally, the appended drawings and the following description are provided in order for a person skilled in the art to sufficiently understand the present disclosure, and are not intended to limit the priority that is disclosed in the claims.

Hereinafter, the preferred present embodiment for implementing the present disclosure will be described with reference to the drawings.

Figure 2:
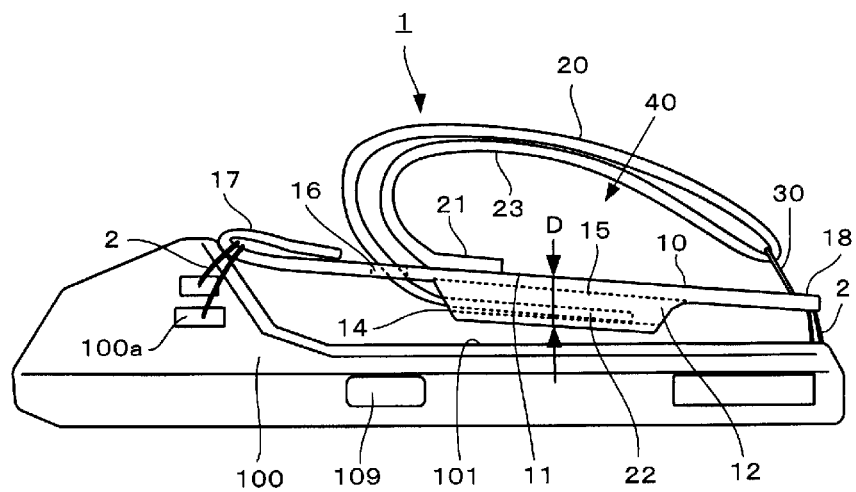
FIG. 2 is a side view of the hand strap for an electronic apparatus of FIG. 1.
Figure 3:
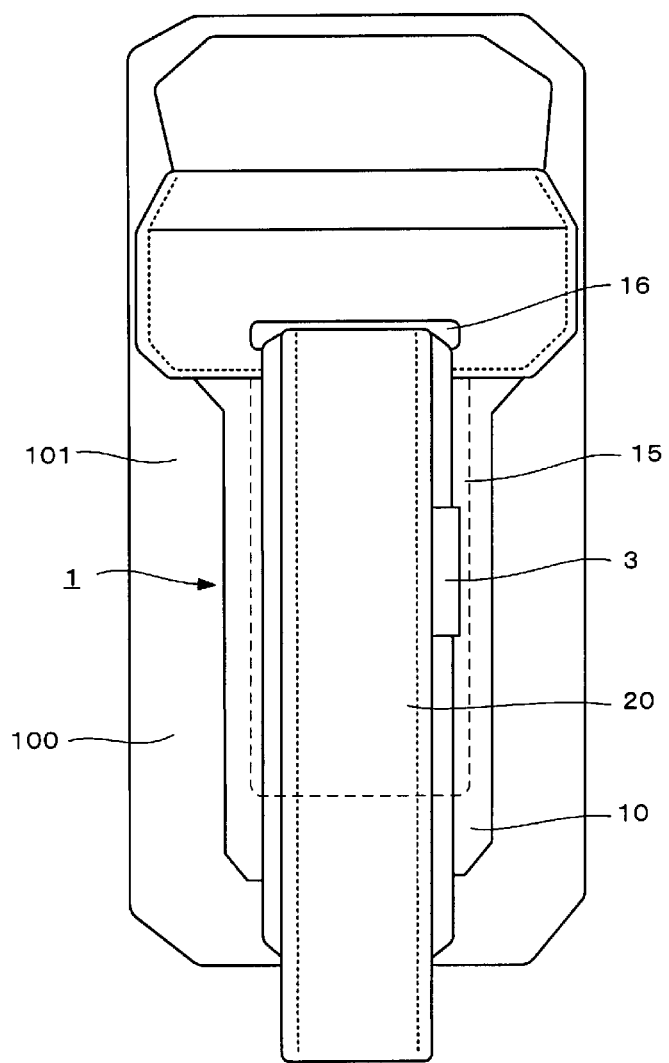
FIG. 3 is a front view of the hand strap for an electronic apparatus of FIG. 1.

FIG. 1 is a front perspective view of a hand strap for an electronic apparatus according to an embodiment of the present disclosure, FIG. 2 is a side view, FIG. 3 is a front view, and an example of a hand strap for an electronic apparatus will be explained in detail using FIGS. 1 to 3.

Hand strap for electronic apparatus 1 is formed from leather, or the like, and is attached to rear surface 101 of electronic apparatus 100 in a removable manner in a substantially oblong form. Hand strap for electronic apparatus 1 is provided with substantially flat form first gripper 10, and band form second gripper 20 that is bendable. First gripper 10 has a substantially oblong form when viewed in a planar manner in the present embodiment, but may have an elliptical form, or the like, and is not particularly limited.

First gripper 10 is provided with main body 11 that is disposed in a longitudinal direction of rear surface 101 of electronic apparatus 100, first side surface 12 and second side surface 13 which are provided on both sides of a substantial central portion of main body 11, and protrude toward rear surface 101 side. In addition, first gripper 10 is provided with accommodation portion 15 that forms a substantial box shape which is defined by main body 11, first side surface 12, and second side surface 13, an inner portion of which has a hollow cavity form, and in which opening 14 is formed at one end. In addition, slit 16 is formed in the vicinity of opening 14 of main body 11 in a direction that is orthogonal to the longitudinal direction, and folded-back portion 17, which is folded back in a U-shape, is provided at a tip end portion of main body 11. Accommodation portion 15 may be a groove form, or may be a form in which rear surface 101 side of electronic apparatus 100 is open.

In the present embodiment, in first gripper 10, it is possible to attach folded-back portion 17 of main body 11 and end 18, which is on the opposite side to folded-back portion 17, to rear surface 101 of electronic apparatus 100 as a result of cords 2, or the like, for example, being attached to strap holes 100a, which are provided in electronic apparatus 100. In addition, in the present embodiment, the bottom surface of first gripper 10 is in a state of being separated from rear surface 101 of electronic apparatus 100, but may come into contact with rear surface 101.

Second gripper 20 includes fixed portion 21 in which one end of second gripper 20 is fixed to the upper portion of main body 11 of first gripper 10, and extra-long portion 22 in which the other end acts as a free end. Second gripper 20 extends in a band form in end 18 direction of main body 11 from fixed portion 21, is bent in a substantial U-shape as a result of passing through metal attachment fitting 30 that has a substantially square-shaped cross-section and is fixed to end 18, and furthermore, is disposed in a band form toward folded-back portion 17 of main body 11. In addition, extra-long portion 22 is accommodated inside accommodation portion 15 as a result of penetrating through slit 16 of main body 11 and passing through opening 14. Pen holder 3, or the like, is provided on a side surface of second gripper 20.

It is possible to adjust the entire length of second gripper 20 by changing an accommodation ratio of extra-long portion 22 in accommodation portion 15. Finger accommodation space 40 is defined between the upper portion of main body 11 of first gripper 10 and bottom portion 23 of second gripper 20, a finger other than a thumb is disposed and it is possible to freely change an opening degree of finger accommodation space 40 that matches the size of a finger by adjusting extra-long portion 22.

It is necessary for first gripper 10 to have predetermined thickness D (refer to FIG. 2) in order to grip first gripper 10 using the pad (the place where the fingerprint is) and the tip end (the finger tip) of a finger other than a thumb on first side surface 12 or second side surface 13 of first gripper 10. For example, it is desirable that thickness D is at least 5 mm or more, and as long as it is 5 mm or more, it is possible to reliably grip with a pad and a tip end of a finger other than a thumb. In addition, a certain degree of strength is necessary in first gripper 10, first gripper 10 is formed using a hard material (for example, having a thickness in which between one and several sheets of thick paper are coated with leather), and a resin, a metal, or the like may be used.

Figure 4:
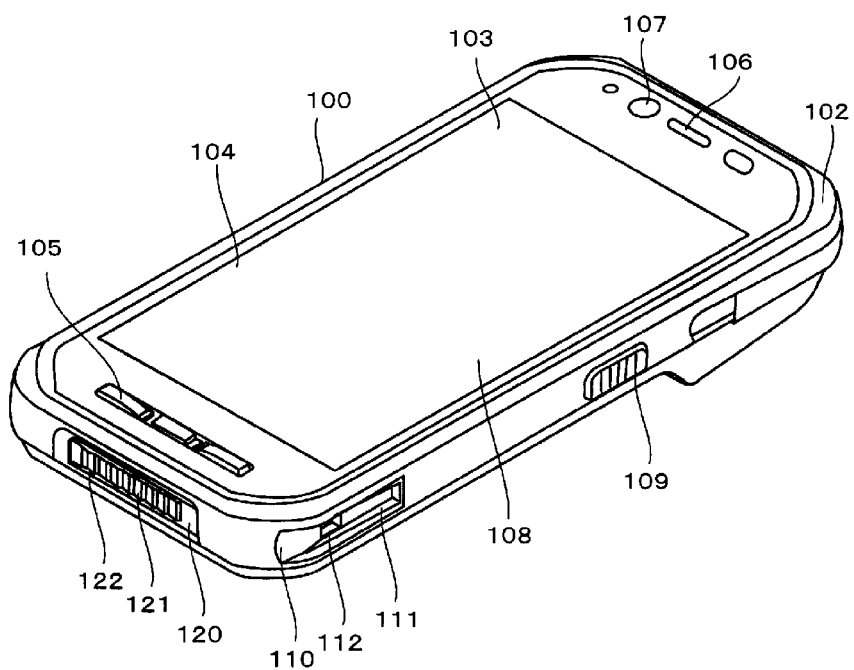
FIG. 4 is a front perspective view that shows an example of an electronic apparatus to which the hand strap for an electronic apparatus according to the present disclosure is attached.

FIG. 4 is a front perspective view that shows an example of an electronic apparatus. An example of an electronic apparatus to which the hand strap for an electronic apparatus of the present embodiment is attached will be described using FIG. 4.

For example, electronic apparatus 100 is a mobile phone such as a smartphone, a tablet, a portable measurement instrument, a portable information device, a mobile communication terminal, or the like. In the present embodiment, a mobile communication type portable terminal device that is provided with shock resistance, vibration resistance, drip proofing, dust proofing, or the like, is used at commercial sites such as factories, construction sites, public safety sites, carrier sites, and the like, and is heavier than a general mobile phone, is used as an example. Electronic apparatus 100 is formed from casing 102 that has a substantially rectangular parallelepiped form, and has a substantially oblong form when viewed in a planar manner.

Display 104, press operator 105, speaker 106, camera 107, and the like, are disposed on front surface 103 of electronic apparatus 100. Display 104 is provided with touch panel 108 having a substantially rectangular shape when viewed in a planar manner, is formed from a liquid crystal panel, an organic EL panel, or the like, displays icons, images, information data, and the like, and has a display function of a user interface (UI) of which operation is possible. In addition, side switch 109, and guide 110, which is used during installation in a charging platform (a charging adapter), or the like, are also provided on a side surface of electronic apparatus 100. As a result of convex portions, which are provided in a charging platform, or the like, being guided inside grooves 111 of guide 110, which are provided in guide 110 in the lower portions of both side surfaces of electronic apparatus 100, when electronic apparatus 100 is installed in a charging platform, it is possible to perform easy installation due to smooth positioning. In addition, concave portions 112 are provided on the bottom surface of grooves 111, which are both side surfaces.

Connector 120 is provided on the bottom surface of electronic apparatus 100, and at least the two types of connector of connector for electrical signals 121 and connector for charging 122 are provided in connector 120. By connecting to connector 120, it is possible to perform communication such as data communication while charging.

Figure 5A:
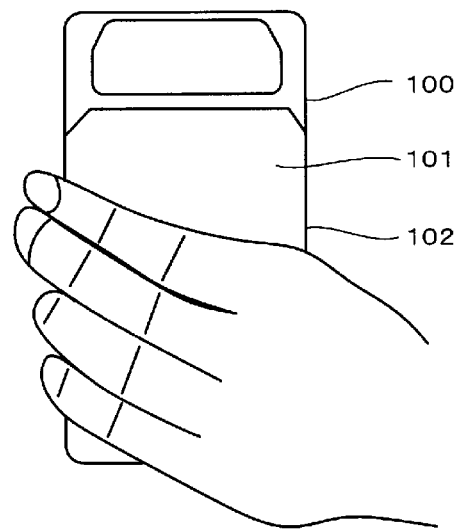
FIG. 5A is an explanatory view that shows a rear surface of an electronic apparatus to which the hand strap for an electronic apparatus according to the present disclosure is not attached.

In order to show the features of hand strap for electronic apparatus 1 of the present disclosure, the inconvenience of a case in which there is no hand strap for electronic apparatus 1 will be described using FIGS. 5A and 5B. On the other hand, the ease of operation while holding electronic apparatus 100 that is provided with hand strap for electronic apparatus 1 of the present embodiment, with one hand will be described using FIGS. 6A and 6B.

Figure 5B:
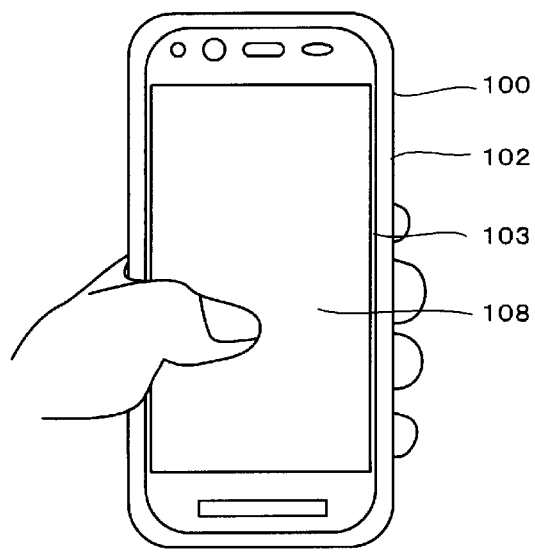
FIG. 5B is an explanatory view that shows a front surface of an electronic apparatus to which the hand strap for an electronic apparatus according to the present disclosure is not attached.

In a case of operating electronic apparatus 100 with one hand, the palm of the hand is generally caused to abut against rear surface 101 of electronic apparatus 100, casing 102 side surfaces of electronic apparatus 100 are pressed by the fingertips other than the thumb (refer to FIG. 5A), and scrolling, tapping, or the like, is performed while bringing the front surface of the thumb into contact with touch panel 108 (refer to FIG. 5B). However, recent electronic apparatuses 100 are enlarged, and, in addition, industrial electronic apparatuses 100 are enlarged and slightly heavy, holding of electronic apparatuses 100 of the related art is unstable depending on the hand, and it is difficult to adequately reach the tip end of a thumb across the wide area of touch panel 108.

Figure 6A:
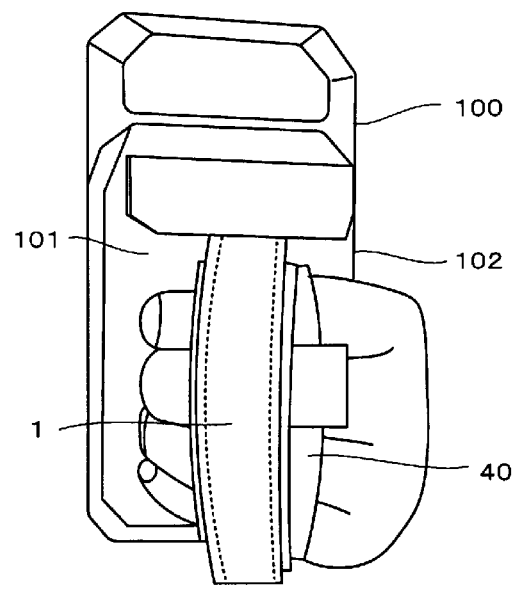
FIG. 6A is an explanatory view that shows a rear surface of an electronic apparatus to which the hand strap for an electronic apparatus according to the present disclosure is attached.
Figure 6B:
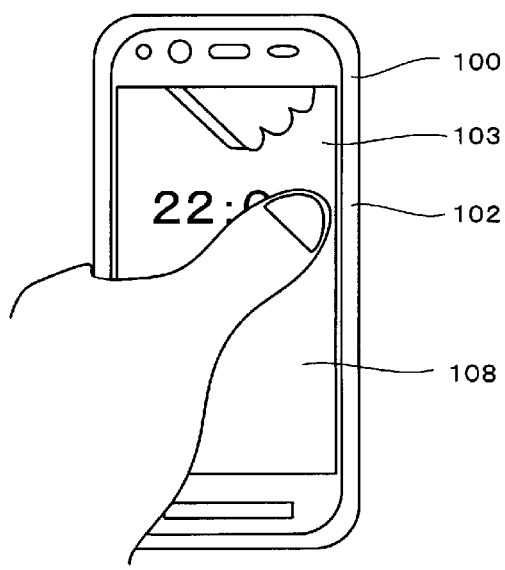
FIG. 6B is an explanatory view that shows a front surface of an electronic apparatus to which the hand strap for an electronic apparatus according to the present disclosure is attached.

In electronic apparatus 100 to which hand strap for electronic apparatus 1 of the present disclosure is attached, fingers other than the thumb pass through finger accommodation space 40, in which the fingers other than the thumb are disposed, on rear surface 101 side, and the pads and tip ends of finger other than the thumb are caused to abut against first side surface 12 or second side surface 13 of first gripper 10 (refer to FIG. 6A). It is possible to grip first gripper 10 and electronic apparatus 100 using the fingers and the palm of the hand, electronic apparatus 100 is stable inside the hand, the thumb reaches across the wide area of touch panel 108 (refer to FIG. 6B), and it is possible to easily perform operation of touch panel 108.

That is, in comparison with the case in which there is no hand strap for electronic apparatus 1, which is shown in FIGS. 5A and 5B, since the thumb sticks out greatly on the opposite side to the base side of the thumb, it is easy for a thumb operation to reach throughout the wide area of touch panel 108. In addition, electronic apparatus 100 is held and stabilized with all of the fingers other than the thumb as a result of the back of the hand being supported in finger accommodation space 40 due to first gripper 10 and second gripper 20.

In the present embodiment, first gripper 10 is disposed on rear surface 101 of electronic apparatus 100 in a substantial central portion with respect to both side surfaces that are orthogonal to the longitudinal direction of electronic apparatus 100, and therefore, compatibility with both right-handers and left-handers is possible. Furthermore, it is possible to cause the vicinities of the bases of the fingers to abut against the side surfaces of casing 102 of electronic apparatus 100, there is space for movement of the thumb with respect to touch panel 108, and therefore, it is also possible to stably perform operation of side switch 109, which is on the side surface of electronic apparatus 100.

According to the above-mentioned configuration, hand strap for electronic apparatus 1 of the present embodiment is provided with first gripper 10, which can be attached to rear surface 101 of electronic apparatus 100, and is gripped by the pad of a finger other than a thumb, and a tip end of a finger other than a thumb, and second gripper 20 that is provided on a far side from rear surface 101 with respect to first gripper 10, and that defines finger accommodation space 40 in which a finger other than a thumb is disposed in the space between first gripper 10 and second gripper 20.

As a result of this, since holding of electronic apparatus 100 using one hand is stable, it is possible for the thumb of the one hand performing the holding to move across a wide area of touch panel 108.

According to the above-mentioned configuration, in hand strap for electronic apparatus 1 of the present embodiment, second gripper 20 includes extra-long portion 22 that can adjust the entire length of second gripper 20. As a result of this, using extra-long portion 22, it is possible to handle differences in the size and thickness of hands. In addition, since it is possible to allow for some leeway in finger accommodation space 40, it is easy to move the hand in an up-down direction while performing holding, and therefore, for example, operation of side switch 109 with the thumb is also easy.

According to the above-mentioned configuration, in hand strap for electronic apparatus 1 of the present embodiment, first gripper 10 includes accommodation portion 15 that can accommodate extra-long portion 22. As a result of this, using accommodation portion 15, it is possible to prevent a circumstance in which extra-long portion 22 obstructs operation or camera shooting.

According to the above-mentioned configuration, in hand strap for electronic apparatus 1 of the present embodiment, first gripper 10 has a substantially oblong form in a planner manner. As a result of this, compatibility with the shape of electronic apparatus 100 is possible.

According to the above-mentioned configuration, in hand strap for electronic apparatus 1 of the present embodiment, thickness D of first gripper 10 is 5 mm or more. As a result of this, due to having the predetermined thickness D, it is possible for the pads and the tip ends of fingers other than the thumb to hold onto first gripper 10 and therefore, it is possible to extend the thumb greatly over front surface 103 of electronic apparatus 100 while gripping electronic apparatus 100 with these fingers.

Figure 7:
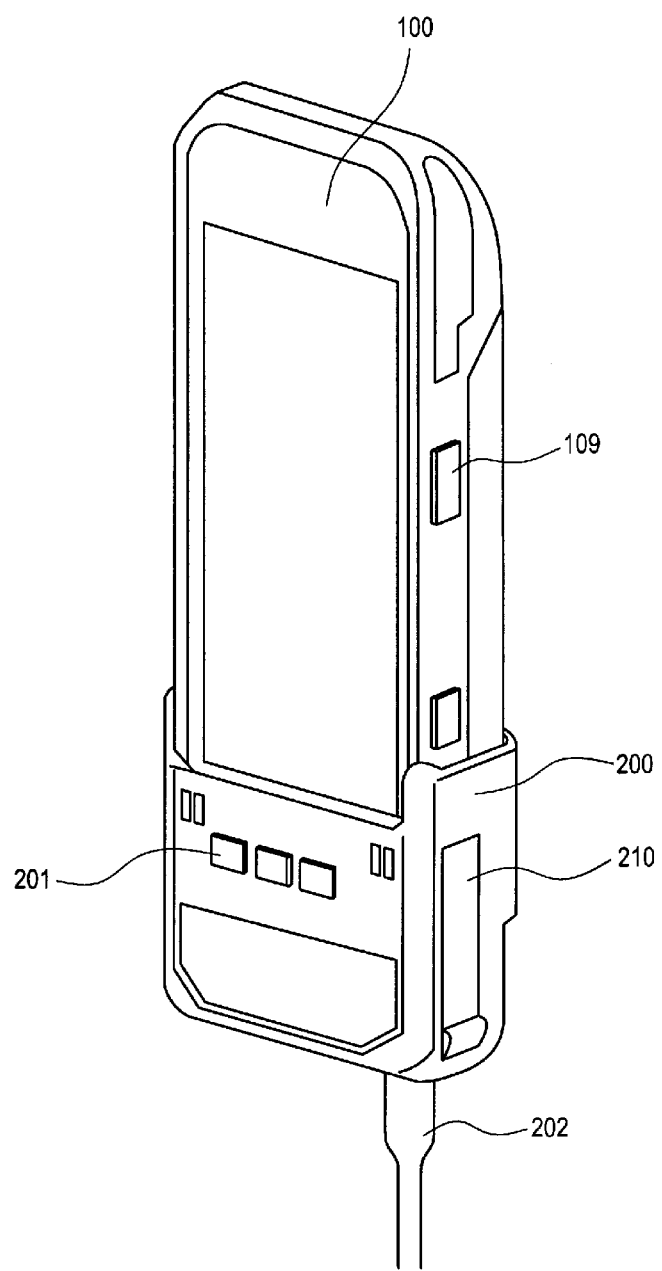
FIG. 7 is an external perspective view that shows a state in which a charging adapter according to the present disclosure is installed in the electronic apparatus.

Next, charging adapter 200 of electronic apparatus 100 will be described using the drawings. FIG. 7 is an external perspective view of a state in which a charging adapter according to the present disclosure is installed in an electronic apparatus, FIG. 8 is a schematic cross-sectional view that describes the state in which the charging adapter according to the present disclosure is installed in the electronic apparatus, and an example of the charging adapter will be explained in detail using FIGS. 7 and 8.

In FIG. 7, charging adapter 200 can be installed in a manner that covers the lower portion of electronic apparatus 100 including press operator 105 and guide 110, and is provided with hooks 210 on both side surfaces of charging adapter 200. A power source plug is provided on the back surface of charging adapter 200, and power source cable 202 is connected to a power source plug. Press operator 201 of charging adapter 200 is provided with a plunger on the back surface thereof, and the plunger is exposed from the inner wall of charging adapter 200. The plunger is provided in a position that faces press operator 105 of electronic apparatus 100 when electronic apparatus 100 is installed in charging adapter 200. When press operator 201 of charging adapter 200 is pressed, since press operator 105 of electronic apparatus 100 is pressed by a plunger, it is possible to perform operation in a state in which electronic apparatus 100 is installed in charging adapter 200.

Figure 8:
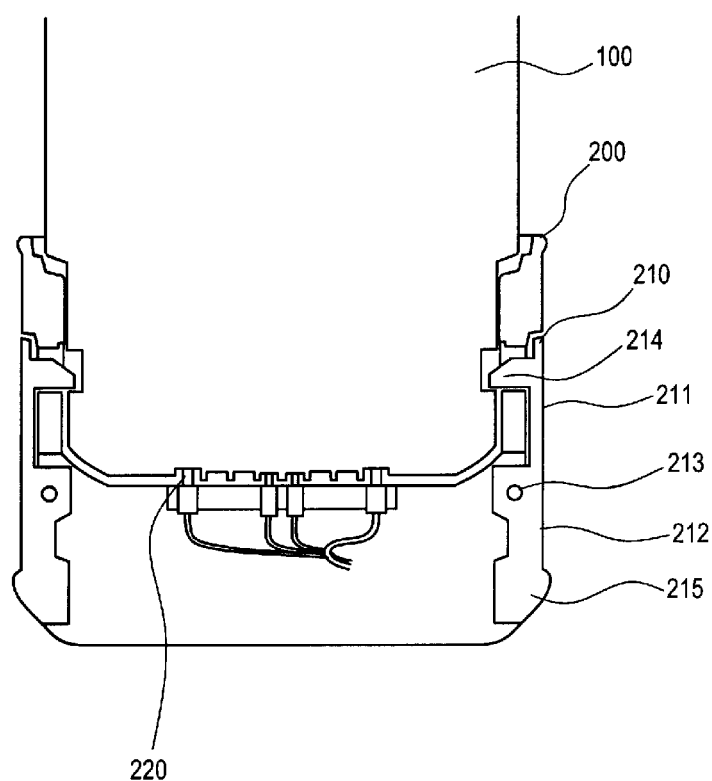
FIG. 8 is a schematic cross-sectional view that describes the state in which the charging adapter according to the present disclosure is installed in the electronic apparatus.

In FIG. 8, hook 210 is provided with upper portion 211, lower portion 212, and shaft portion 213 in the center of hook 210, and forms a seesaw structure with shaft portion 213 as the center. First locker 214 is provided on a tip end inner side of upper portion 211, and second locker 215 is provided on a tip end outer side of lower portion 212. In hook 210, a load, with which first locker 214 is biased toward the inner wall side of charging adapter 200 is always applied, and first locker 214 is exposed from the inner wall of charging adapter 200. When electronic apparatus 100 is installed in charging adapter 200, first locker 214 locks together with concave portions 112 of electronic apparatus 100. When a user pushes lower portion 212 in a direction of the inner wall side of charging adapter 200, as a result of the seesaw structure with shaft portion 213 as the center, a locking state is released due to first locker 214 becoming separated from concave portions 112 of electronic apparatus 100.

Charging pins 220 are provided on the bottom surface of the inner wall of charging adapter 200, and are connected to the power source plug, which is provided on the back surface of charging adapter 200. Charging pins 220 are provided in positions that face connector for charging 122 of electronic apparatus 100 when electronic apparatus 100 is installed in charging adapter 200, and come into contact with connector for charging 122. Pins are not provided in a position that faces connector for electrical signals 121 of electronic apparatus 100. According to this configuration, even if both connector for electrical signals 121 and connector for charging 122 are provided in connector 120 of electronic apparatus 100, it is possible to use connector 120 in a use that is specialized for charging as a result of a user using charging adapter 200.

Figure 9:
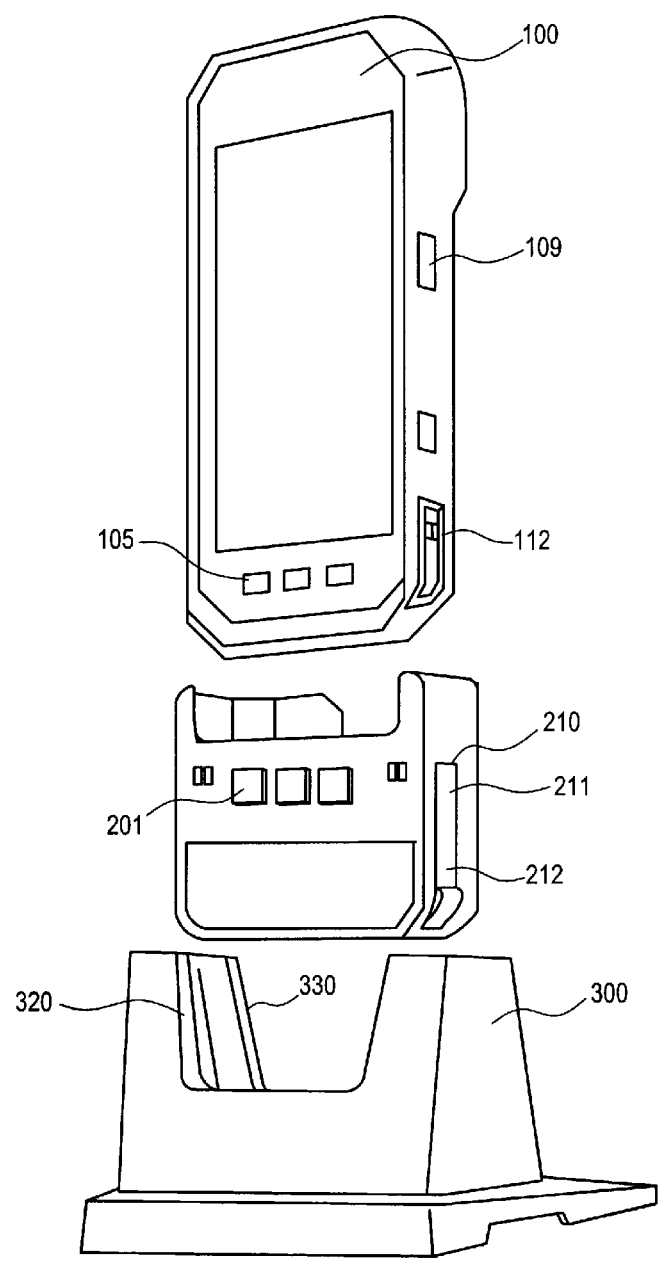
FIG. 9 is an external perspective view of a stand that can accommodate the charging adapter according to the present disclosure.

Next, a state in which charging adapter 200 is installed in stand 300 will be described using the drawings. FIG. 9 is an external perspective view of stand 300 that can accommodate charging adapter 200 according to the present disclosure, FIG. 10 is an external perspective view of a state in which charging adapter 200 according to the present disclosure is accommodated in stand 300 in a state of being installed on an electronic apparatus, FIG. 11 is an external perspective view of stand 300 in a state in which charging adapter 200 according to the present disclosure is accommodated, FIG. 12 is a schematic cross-sectional view that describes a state in which charging adapter 200 according to the present disclosure is accommodated in stand 300 in a state of being installed on an electronic apparatus, and an example of stand 300 will be explained in detail using FIGS. 9 to 12.

Figure 10:
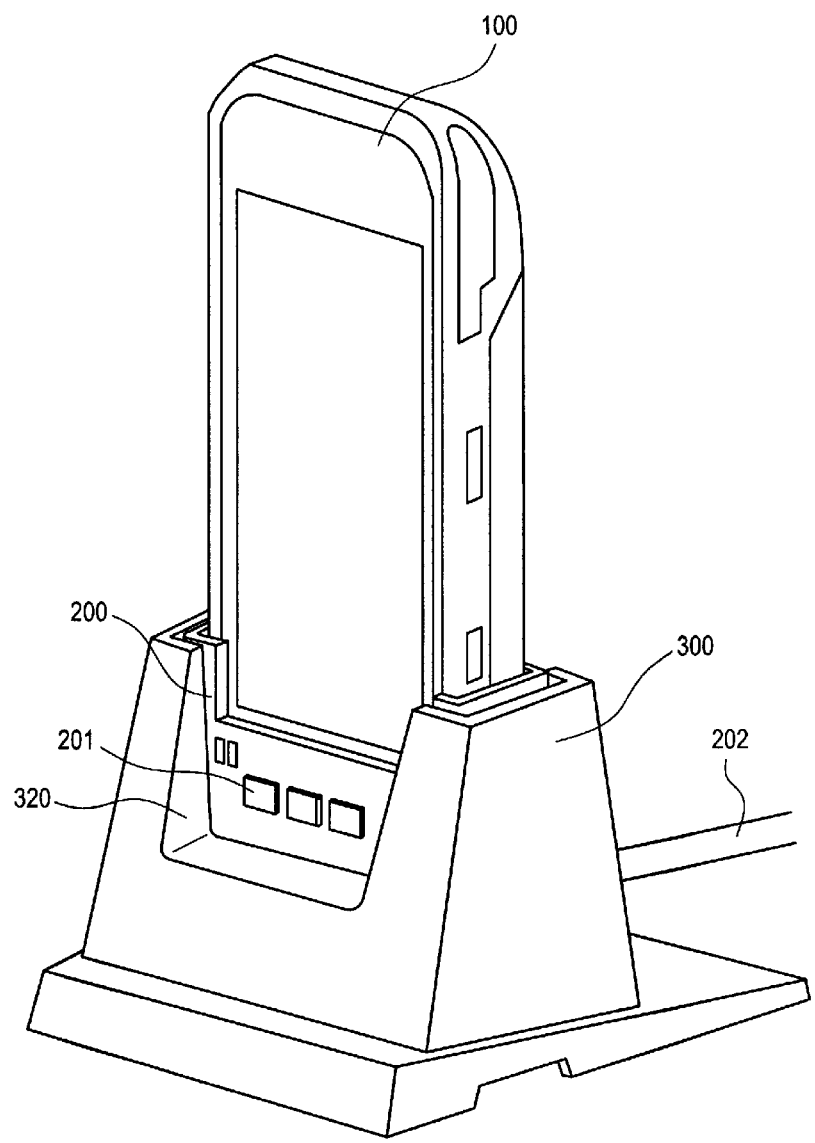
FIG. 10 is an external perspective view of a state in which a charging adapter according to the present disclosure is accommodated in the stand in a state of being installed on an electronic apparatus.
Figure 11:
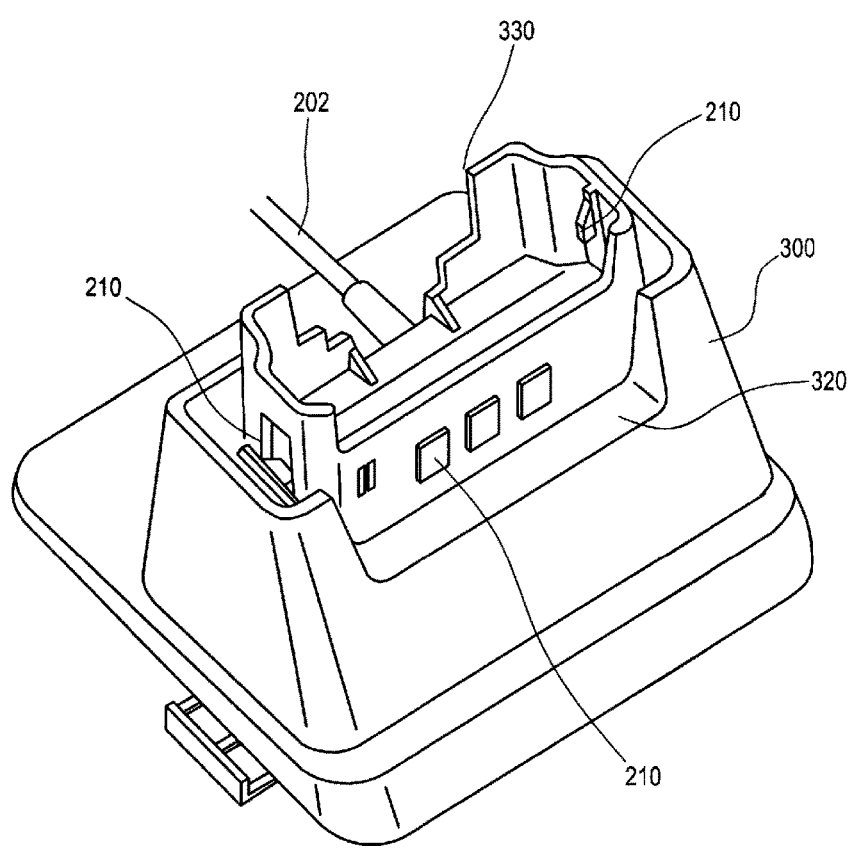
FIG. 11 is an external perspective view of the stand in a state in which the charging adapter according to the present disclosure is accommodated.

In FIGS. 9 to 11, stand 300 is configured so that charging adapter 200 can be installed therein, and is provided with notched portion 320 on the front surface of stand 300. When charging adapter 200 and electronic apparatus 100 are installed in stand 300, since press operator 201 of charging adapter 200 is exposed by notched portion 320, it is possible to perform operation in a state of being installed in stand 300. In addition, since notched portion 330 is also provided on the back surface of stand 300, installation in stand 300 is possible in a state in which power source cable 202 is linked to the power source plug of charging adapter 200.

Figure 12:
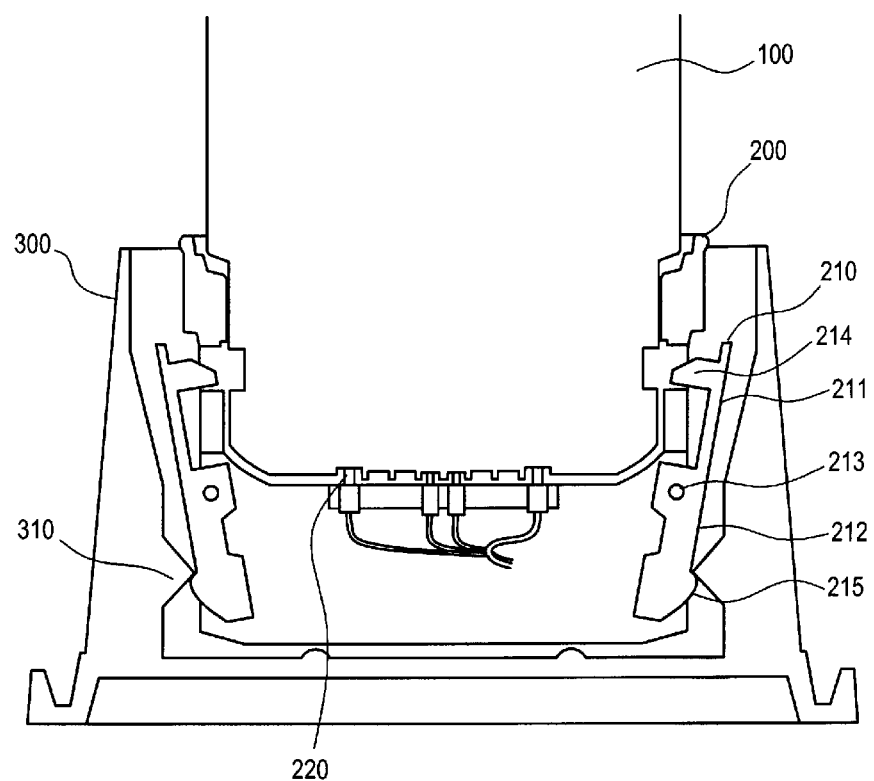
FIG. 12 is a schematic cross-sectional view that describes a state in which the charging adapter according to the present disclosure is accommodated in the stand in a state of being installed on an electronic apparatus.

In FIG. 12, projections 310 are provided on the inner walls of stand 300. Projections 310 are respectively provided in positions that face the lower portion 212 of hook 210 when charging adapter 200 is installed in stand 300. Since projections 310 continuously press lower portion 212 during installation of the charging adapter, first locker 214 of hook 210 is in a direction that spreads toward the outer side. Therefore, even if electronic apparatus 100 is installed in charging adapter 200, which is installed in stand 300, since first locker 214 is in a direction that spreads toward the outer side, electronic apparatus 100 is not locked together with charging adapter 200. Accordingly, since it is not necessary to release locking using hook 210 each time electronic apparatus 100 is removed, it is possible to perform removal of electronic apparatus 100 smoothly. As a result of the second locker 215 of charging adapter 200 being locked together with projections 310 of stand 300 when charging adapter 200 is installed in stand 300, it is possible to prevent a circumstance in which charging adapter 200 comes loose when electronic apparatus 100 is disengaged.

Accordingly, since it is possible for a user to perform use in a state in which charging adapter 200 is installed on electronic apparatus 100, and to use stand 300 as a charging platform by installing the charging adapter in stand 300, it is possible to use the charging adapter for different purposes depending on a use environment of a user.

An embodiment of a hand strap for an electronic apparatus and a charging adapter according to the present disclosure has been described with reference to the drawings, but the present disclosure is not limited to the corresponding examples. It is clear to persons skilled in the art that various altered examples, corrected example, substituted examples, addition examples, deletion examples, and equivalent examples could be conceived of within the range that is set forth in the claims, and it is understood that such examples naturally belong to the technical scope of the present disclosure.

The hand strap for an electronic apparatus of the present disclosure is useful in an application of performing operation while holding a heavy, large type, and industrial electronic apparatus with one hand.

What is claimed is:
1. A hand strap for an electronic apparatus, comprising:
a grip attachable on a rear surface of the electronic apparatus, and adapted to be held by a pad and a tip of a finger other than a thumb, the rear surface having two edges parallel with each other and extending in a first direction; and
a strap that is provided on a far side from the rear surface with respect to the grip, and that defines a finger accommodation space in which the finger other than the thumb is disposed in the space between the grip and the strap, wherein
the grip has a first surface located above the rear surface of the electronic apparatus and located distant from the two edges of the rear surface of the electronic apparatus, the first surface extending in the first direction and in a second direction perpendicular to the first direction, the second direction crossing the rear surface of the electronic apparatus, and a second surface facing the strap,
the first surface of the grip is adapted to be held by the pad and the tip of the finger other than the thumb,
the strap includes a fixed end and a free end,
the fixed end is fixed to the second surface of the grip, and
the free end is located between the upper surface of the grip and the rear surface of the electronic apparatus, and accommodated in the grip.
2. The hand strap for an electronic apparatus of claim 1, wherein the grip has a substantially rectangular form when viewed in a planar manner.
3. The hand strap for an electronic apparatus of claim 1, wherein the thickness of the grip is 5 mm or more.

* * * * *